(12) United States Patent
Yee

(10) Patent No.: US 7,787,706 B2
(45) Date of Patent: *Aug. 31, 2010

(54) METHOD FOR CONTROLLING AN INTENSITY OF AN INFRARED SOURCE USED TO DETECT OBJECTS ADJACENT TO AN INTERACTIVE DISPLAY SURFACE

(75) Inventor: Dawson L. Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 1458 days.

This patent is subject to a terminal disclaimer.

(21) Appl. No.: 10/867,434

(22) Filed: Jun. 14, 2004

(65) Prior Publication Data

US 2005/0277071 A1    Dec. 15, 2005

(51) Int. Cl.
*H04N 5/33* (2006.01)
*G09G 3/34* (2006.01)
(52) U.S. Cl. .................. 382/274; 382/254; 345/84; 345/211; 348/164; 348/241
(58) Field of Classification Search ........... None
See application file for complete search history.

(56) References Cited

U.S. PATENT DOCUMENTS

| | | | |
|---|---|---|---|
| 5,109,537 A | 4/1992 | Toki |
| 5,319,214 A | 6/1994 | Gregory |
| 5,436,639 A | 7/1995 | Arai |
| 5,483,261 A | 1/1996 | Yasutake |
| 5,526,177 A | 6/1996 | Fantone |
| 5,528,263 A | 6/1996 | Platzker |
| 5,821,930 A | 10/1998 | Hansen |
| 5,831,601 A | 11/1998 | Vogeley |
| 5,835,692 A | 11/1998 | Cragun |
| 5,900,863 A | 5/1999 | Numazaki |
| 5,920,688 A | 7/1999 | Cooper |
| 5,940,076 A | 8/1999 | Sommers |
| 5,973,315 A | 10/1999 | Saldana |
| 5,973,689 A | 10/1999 | Gallery |
| 6,128,003 A | 10/2000 | Smith |
| 6,154,214 A | 11/2000 | Uyehara |
| 6,181,343 B1 | 1/2001 | Lyons |
| 6,266,061 B1 | 7/2001 | Doi |
| 6,269,172 B1 | 7/2001 | Rehg |
| 6,340,119 B2 | 1/2002 | He |
| 6,448,987 B1 | 9/2002 | Easty |
| 6,469,722 B1 | 10/2002 | Kinoe |
| 6,476,378 B2 | 11/2002 | Nougaret |
| 6,520,648 B2 | 2/2003 | Stark |
| 6,522,395 B1 | 2/2003 | Barnji |
| 6,529,183 B1 | 3/2003 | MacLean |
| 6,545,663 B1 | 4/2003 | Arbter |
| 6,600,475 B2 | 7/2003 | Gutta |
| 6,614,422 B1 | 9/2003 | Rafii |
| 6,654,007 B2 | 11/2003 | Ito |
| 6,690,363 B2 | 2/2004 | Newton |
| 6,710,770 B2 | 3/2004 | Tomasi |
| 6,714,221 B1 | 3/2004 | Christie |
| 6,720,949 B1 | 4/2004 | Pryor |
| 6,750,877 B2 | 6/2004 | Rosenberg |
| 6,781,069 B2 | 8/2004 | Silverstein |
| 6,788,813 B2 | 9/2004 | Cooper |
| 6,791,530 B2 | 9/2004 | Vernier |
| 6,804,396 B2 | 10/2004 | Higaki |
| 6,812,907 B1 | 11/2004 | Gennetten |
| 6,840,627 B2 | 1/2005 | Olbrich |
| 6,888,960 B2 | 5/2005 | Penev |
| 6,959,102 B2 | 10/2005 | Peck |
| 7,007,236 B2 | 2/2006 | Dempski |
| 7,075,687 B2 | 7/2006 | Lippert |
| 7,084,859 B1 | 8/2006 | Pryor |
| 7,095,401 B2 | 8/2006 | Liu |
| 7,120,280 B2 | 10/2006 | Biswas |
| 7,144,117 B2 | 12/2006 | Kojima |

(Continued)

FOREIGN PATENT DOCUMENTS

EP    0690407    1/1996

(Continued)

OTHER PUBLICATIONS

Office Action mailed Aug. 30, 20007 cited in related U.S. Appl. No. 10/870,777.

(Continued)

*Primary Examiner*—Daborah Chacko Davis
(74) *Attorney, Agent, or Firm*—Workman Nydegger

(57) ABSTRACT

In an interactive display table that uses infrared (IR) light to detect an object on an interactive display surface, IR light sources within the table are controlled in response to the level of ambient IR light passing through the interactive display surface. Light from the IR light sources that is reflected the regions disposed inside the table and peripherally around the interactive display surface is captured in an image that also includes the ambient IR light passing through the interactive display surface. A signal corresponding to the image is processed, so that the relative levels of the IR light can be compared. The IR light sources are then controlled so that the level of IR light reflected from the regions exceeds the level of ambient IR light by at least a predefined amount.

10 Claims, 5 Drawing Sheets

U.S. PATENT DOCUMENTS

| | | | |
|---|---|---|---|
| 7,161,578 | B1 | 1/2007 | Schneider |
| 7,268,774 | B2 | 9/2007 | Pittel |
| 7,310,085 | B2 | 12/2007 | Holloway |
| 7,372,977 | B2 | 5/2008 | Fujimura |
| 7,379,562 | B2 * | 5/2008 | Wilson ................... 382/103 |
| 7,404,146 | B2 | 7/2008 | Bennetts |
| 7,418,671 | B2 | 8/2008 | Hama |
| 7,665,041 | B2 | 2/2010 | Wilson |
| 2001/0012001 | A1 | 8/2001 | Rekimoto |
| 2002/0006786 | A1 | 1/2002 | Mine |
| 2003/0156756 | A1 | 8/2003 | Gokturk |
| 2003/0161524 | A1 | 8/2003 | King |
| 2004/0001113 | A1 | 1/2004 | Zipperer |
| 2004/0005920 | A1 | 1/2004 | Soltys |
| 2004/0090524 | A1 | 5/2004 | Belliveau |
| 2004/0155902 | A1 | 8/2004 | Dempski |
| 2004/0196371 | A1 | 10/2004 | Kono |
| 2005/0050476 | A1 | 3/2005 | SanGiovanni |
| 2005/0122308 | A1 | 6/2005 | Bell |
| 2005/0151850 | A1 | 7/2005 | Ahn |
| 2005/0212753 | A1 | 9/2005 | Marvit |
| 2005/0226467 | A1 | 10/2005 | Hatano |
| 2005/0226505 | A1 | 10/2005 | Wilson |
| 2005/0227217 | A1 | 10/2005 | Wilson |
| 2005/0238201 | A1 | 10/2005 | Shamaie |
| 2005/0245302 | A1 | 11/2005 | Bathiche |
| 2005/0255434 | A1 | 11/2005 | Lok |
| 2005/0281475 | A1 | 12/2005 | Wilson |
| 2006/0010400 | A1 | 1/2006 | Dehlin et al. |
| 2006/0034492 | A1 | 2/2006 | Siegel |
| 2006/0036944 | A1 | 2/2006 | Wilson |
| 2006/0056662 | A1 | 3/2006 | Thieme |
| 2006/0092170 | A1 | 5/2006 | Bathiche |
| 2006/0092267 | A1 | 5/2006 | Dempski |
| 2006/0178212 | A1 | 8/2006 | Penzias |
| 2006/0244719 | A1 | 11/2006 | Brigham |
| 2006/0289760 | A1 | 12/2006 | Bathiche |
| 2007/0046625 | A1 | 3/2007 | Yee |
| 2007/0063981 | A1 | 3/2007 | Galyean |
| 2007/0075163 | A1 | 4/2007 | Wilson |
| 2007/0126717 | A1 | 6/2007 | Cohen |
| 2007/0157095 | A1 | 7/2007 | Bilow |
| 2007/0279494 | A1 | 12/2007 | Aman |
| 2008/0036732 | A1 | 2/2008 | Wilson |
| 2008/0122786 | A1 | 5/2008 | Pryor |
| 2009/0121894 | A1 | 5/2009 | Wilson |
| 2009/0262070 | A1 | 10/2009 | Wilson |

FOREIGN PATENT DOCUMENTS

| | | |
|---|---|---|
| FR | 27656077 | 9/2007 |
| JP | 2004319364 | 11/2004 |
| JP | 2006031941 | 2/2006 |
| JP | 2007514242 | 5/2007 |
| WO | 9714075 | 4/1997 |
| WO | 9819292 | 5/1998 |
| WO | 2005057399 | 6/2005 |

OTHER PUBLICATIONS

Office Action mailed Jun. 29, 2007 cited in related U.S. Appl. No. 10/834,675.

Pavlidis, Ioannis, et al. "A Vehicle Occupant Counting System Based on Near-Infrared Phenomenology and Fuzzy Neural Classification", IEEE Transactions on Intelligent Transportation System, New York, NY, vol. 1, No. 2., Jun. 2000, pp. 78-80.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Hardenberg Von. Christian, "Fingertracking and Handposture Recognition for Real-Tim Human-Computer Interaction", Berlin, Jul. 20, 2001.

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1, 2-Dimensional Bar Code Page." Available http://www.adamsl.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

Bier, Stone, Pier, Buston, and DeRose. "Toolglass and Magic Lenses: The See-Through Interface." *Proceedings of Siggraph '93* (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2 &tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1 pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR'2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts.* The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001.* 3(2). pp. 1-10.

Kobayashi, Hirano, Narita, and Ishii. "A Tangible Interface for IP Network Simulation." *CHI 2003,* Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction,* vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction in Semi-Immersive Virtual Environments." *Proceedings of the IEEE Virtual Reality 2000 Conference,* Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03),* Oct. 12-15, 2003, Seattle, Washington. 2pp.

Malandain, Grégoire, "Connected Components Extraction." Available http://www-sop.inria.fr/epidaure/personnel/malandain/segment/connexe.html. Printed Dec. 18, 2003, 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99.* Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002,* Oct. 27-30, 2002. © 2002 ACM. 10pp.

Paradiso, Hsiao, Strickon, Lifton, and Adler. "Sensor systems for interactive surfaces." *IBM Systems Journal,* vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001,* Mar. 31-Apr. 5, 2001, ACM Press, © ACM. 8pp.

Patten, Recht, and Ishii. "Audiopad: A Tag-based Interface for Musical Performance." *Proceedings of Conference on New Interface for Musical Expression (NIME '02).* Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000,* 2000. 10pp.

Rekimoto and Matsushita. "Perceptual Surfaces: Towards a Human and Object Sensitive Interactive Display." *Proceedings of Workshop on Perceptural User Interactes (PUI'97),* 1997. 3pp.

Rekimoto and Nagao. "The World through the Computer: Computer Augmented Interaction with Real World Environments." *Proceedings of UIST'95,* 1995. pp. 29-36.

Rekimoto and Saitoh. "Augmented Surfaces: A Spatially Continuous Work Space for Hybrid Computing Environments." *CHI '99,* May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98),* 1998. 6pp.

Rekimoto, Jun. "Multiple-Computer User Interfaces: 'Beyond the Desktop' Direct Manipulation Environments." *ACI CHI2000 Video Proceedings,* 2000. 2pp.

Rekimoto, Jun. "Pick-and-Drop: A Direct Manipulation Technique for Multiple Computer Environments." *Proceedings of UIST'97,* 1997. pp. 31-39.

Rekimoto, Jun. "SmartSkin: An Infrastructure for Freehand Manipulation on Interactive Surfaces." *CHI 2002,* Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01,* Mar. 31-Apr. 4, 2001, Seattle, WA. © 2001 ACM 1-58113-327-08/01/0003. 8pp.

Reznik, Canny, and Alldrin. "Leaving on a Plane Jet." *2001 Int. Conf. on Intell. Robots & Systems (IROS),* Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet" *Home>Reviews, TablePCHome.com—Table PC user community.* Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With the Virtual Table." Presented at *1999 ACM Symposium on Interactive 3D Graphics (I3DG '99).* Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003,* Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions.* Mar.-Apr. 2003. pp. 15-22.

Shen, Lesh, Bernier, Forlines, and Frost. "Sharing and Building Digital Group Histories." *CSCW'02,* Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004,* Apr. 24-29, 2004, Vienna, Austria. © 2004 ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND:. An interactive Landscape for Creativity and Innovation." *Proceedings of the ACM Conference on Human Factors in Computing Systems (CHI'99),* Pittsburgh, Pennsylvania, May 15-20, 1999. ACM Press, New York. pp. 120-127.

Symanzik, Jürgen. "Three-Dimensional Statistical Graphics Based on Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC.* Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

Notice of Allowance mailed Mar. 28, 2008 cited in related U.S. Appl. No. 10/834,675.

Notice of Allowance mailed Feb. 27, 2008 cited in related U.S. Appl. No. 10/814,761.

Office Action mailed Mar. 25, 2008 cited in related U.S. Appl. No. 10/880,167.

Office Action mailed Dec. 13, 2007 cited in related U.S. Appl. No. 10/834,675.

"The Tracking Cube: A Three Dimensional Input Device" IBM Techincal Disclosure Bulletin, IBM Corp. New York, US, vol. 32, No. 3B; Aug. 1, 1989, pp. 91-95.

Northop Grumman "TouchTable™" Brochure © 2005 Northop Grumman Space & Mission Systems Corp. RS1190705. 2pp.

Department of Defence, Department of Defence Logistics Automatic Indentification Technology Handbook for Product and Shipping Label Quality Assurance, Feb. 15, 2000, p. 14, Section 3.3.3.6, http://www.dodait.com/conf/data1199/printquality/print0111r6.doc.

Notice of Allowance dated Apr. 23, 2008 cited in related U.S. Appl. No. 10/969,746.

Office Action dated Jun. 12, 2008 cited in related U.S. Appl. No. 11/117,979.

Office Action dated Oct. 9, 2007 cited in related U.S. Appl. No. 10/813,855.

Office Action dated May 7, 2008 cited in related U.S. Appl. No. 10/813,855.

Related U.S. Appl. No. 12/106,910, filed Apr. 21, 2008.

Related U.S. Appl. No. 12/110,032, filed Apr. 25, 2008.

Office Action dated Jun. 26, 2008 cited in related U.S. Appl. No. 11/364,319.

Office Action dated Jul. 10, 2008 cited in U.S. Appl. No. 10/867,434.

Office Action dated Feb. 8, 2008 cited in U.S. Appl. No. 11/321,551.

Office Action dated Aug. 19, 2008 cited in U.S. Appl. No. 11/321,551.

Notice of Allowance dated Oct. 16, 2007 cited in U.S. Appl. No. 10/814,761.

Office Action dated Aug. 29, 2008 cited in U.S. Appl. No. 10/870,777.

Office Action dated Sep. 2, 2008 cited in U.S. Appl. No. 11/170,234.

Notice of Allowance dated Sep. 11, 2008 cited in U.S. Appl. No. 11/117,979.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

Notice of Allowance dated Oct. 8, 2008 cited in U.S. Appl. No. 10/880,167.

Notice of Allowance Dated Oct. 17, 2008 cited in U.S. Appl. No. 10/969,746.

Office Action dated Oct. 7, 2008 cited in U.S. Appl. No. 11/218,171.

Office Action dated Oct. 30, 2008 cited in U.S. Appl. No. 12/106,910.

Notice of Allowance dated Nov. 14, 2008 cited in U.S. Appl. No. 11/117,979.

Notice of Allowance dated Dec. 31, 2008 cited in U.S. Appl. No. 11/364,319.

Notice of Allowance dated Dec. 31, 2008 cited in U.S. Appl. No. 10/880,167.

Notice of Allowance dated Jan. 12, 2009 cited in U.S. Appl. No. 11/170,234.

Office Action dated Jan. 26, 2009 cited in U.S. Appl. No. 11/321,551.

Office Action dated Feb. 19, 2009 cited in U.S. Appl. No. 10/813,855.

Notice of Allowance dated Mar. 11, 2009 cited in U.S. Appl. No. 10/969,746.

Notice of Allowance dated May 6, 2009 cited in U.S. Appl. No. 10/870,777.

Office Action dated Sep. 24, 2009 cited in U.S. Appl. No. 10/813,855.

Notice of Allowance dated Jun. 25, 2009 cited in U.S. Appl. No. 12/106,910.

Office Action dated Aug. 4, 2009 cited in U.S. Appl. No. 11/321,551.

Office Action dated Apr. 15, 2009 cited in U.S. Appl. No. 11/218,171.

Office Action dated Nov. 23, 2009 cited in U.S. Appl. No. 11/218,171.

Office Action dated Oct. 26, 2009 cited in U.S. Appl. No. 11/321,551.

Office Action dated Mar. 31, 2010 cited in U.S. Appl. No. 11/321,551.

Notice of Allowance mailed Feb. 28, 2008, cited in related U.S. Appl. No. 10/870,777.

* cited by examiner

METHOD FOR CONTROLLING AN INTENSITY OF AN INFRARED SOURCE USED TO DETECT OBJECTS ADJACENT TO AN INTERACTIVE DISPLAY SURFACE

FIELD OF THE INVENTION

The present invention is generally directed to controlling an intensity of light produced by a light source in response to ambient light, and more specifically, pertains to controlling an infrared (IR) light source used for detecting objects placed adjacent to a interactive display surface in response to IR light intensity in ambient light.

BACKGROUND OF THE INVENTION

Several interactive displays are known in the prior art. For example, a user interface platform was developed in the MIT Media Lab, as reported by Brygg Ullmer and Hiroshi Ishii in "The metaDESK: Models and Prototypes for Tangible User Interfaces," *Proceedings of UIST* 10/1997:14-17. This article describes how the metaDESK includes a near-horizontal graphical surface that is used to display two-dimensional (2D) geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface to provide images that are visible to a user from above the graphical display surface. The article further teaches that the IR camera can detect a reflection from the undersurface of passive objects called "phicons" that are placed on the graphical surface. Thus, the IR camera detects an IR reflection from an IR reflective material applied to the bottom of a "Great Dome phicon" when the phicon is placed on the graphical surface and responds by displaying a map of the MIT campus on the graphical surface, with the actual location of the Great Dome in the map positioned where the Great Dome phicon is located. There is no discussion of details involved in detecting an object based upon the IR reflection, or in determining how to compensate for IR light in the ambient that might adversely effect the detection of a phicon using IR light reflected from the phicon.

A similar technique for sensing objects on a display surface is disclosed in several papers published by Jun Rekimoto of Sony Computer Science Laboratory, Inc., in collaboration with others. These papers briefly describe a "HoloWall" and a "HoloTable," both of which use IR light to detect objects that are proximate to or in contact with a display panel on which a rear-projected image is visible. The rear-projection panel, which is vertical in the HoloWall and horizontal in the HoloTable, is semi-opaque and diffusive, so that objects reflecting IR light back through the panel become more clearly visible to an IR camera as they approach and then contact the panel. The system can thus detect a user's fingers or hand, or other objects. Again, these papers fail to discuss the effects on ambient IR light on sensing IR light reflected from objects to detect the object and do not mention any approach for controlling the intensity of the IR light used for sensing objects in response to the ambient IR light level.

It is important to either substantially exclude ambient IR light that might interfere with the detection of an object on an interactive display surface, like those discussed above, or to ensure that the intensity of IR light from an intended IR light source is greater than that of ambient IR light. If the ambient IR light source has a greater intensity when sensed to detect an object, it will substantially preclude the accurate detection of an object placed on a display surface. While the shape of an object placed on an interactive display surface might be detected based upon the shadow that it casts relative to a bright ambient light source disposed behind the object, the details of the object and any IR reflective shape or pattern applied to the object will not be evident. A bright ambient IR light source will effective wash out the reflection from an object placed on an interactive display surface and will thus interfere with the IR vision detection system and its ability to sense the location of an object on the display surface and other distinctive information that is conveyed by the reflected IR light from an intended IR source that is disposed on an opposite side of the display surface from the IR ambient light source. An incandescent light bulb of only 60 watts that is only a few feet from the interactive display surface may prevent an IR vision system from working properly to detect objects on the interactive display surface.

It might seem that an easy solution to this problem is simply to set the intended IR light source at its maximum possible IR output level. However, there may be undesired consequences to this action, since too high an IR light level produced by the intended IR source can adversely affect the operation of other devices that use IR light, such as remote controls. Instead, it would be preferable to control the IR light source used in an interactive display device so that the level of IR light it produces is greater than the ambient IR light level, but not excessively greater. While alternative approaches can be used for compensating for IR light in the ambient, it would be desirable to dynamically control the intended IR light sources used by actually sensing the IR light produced by the intended light sources and comparing with the level of the ambient IR light level in order to control the IR light sources.

SUMMARY OF THE INVENTION

The present invention is thus intended to control the light emitted by the IR light sources that illuminate the undersurface of an interactive display surface, so that the level of that IR light is greater than the level of the ambient IR light that is passing through the interactive display surface. By thus controlling the IR light sources, the level of IR light emitted thereby is kept at a level sufficient to enable objects placed adjacent to the interactive displays surface to be detected, but avoids emitting a greater intensity IR light than is necessary, which might interfere with other types of IR light responsive devices.

However, the present invention is more broadly applicable to controlling the level of other types of light sources relative to ambient light levels. More specifically, one aspect of the present invention is directed to a method for controlling an intensity of a light source in response to an ambient light level. The method includes the steps of providing a region that is substantially prevented from receiving incident ambient light, but is able to receive light emitted by the light source. An image of both the region and a diffusing surface through which the ambient light passes is captured, and a signal corresponding to the image is produced. The signal is then processed to determine a level of the light reflected from the region as well as a level of the ambient light passing through the diffusing surface. Based upon this comparison, the intensity of the light source is controlled so that the level of the light reflected from the region exceeds the ambient light level by a predefined amount.

As noted above, an initial application of the present invention will be used for an interactive display device. Accordingly, for this application, the light source produces IR light, the image that is captured is an IR image, and the ambient light level is an ambient IR light level. Similarly, the diffusing surface comprises an interactive display surface on which an object is detected in response to IR light reflected from the object when the object is disposed adjacent to the interactive display surface. By controlling the intensity of the light source, the IR light reflected from the object will more readily be apparent in the image, relative to the ambient IR light that passes through the interactive display surface.

Preferably, the region is disposed peripherally of the diffusing surface and within an enclosure that shields the region from the ambient light being directly incident on the region. Typically, the ambient light level will not change often, so it may not be necessary to continually monitor the ambient light level to control the light source. Instead, the level of the light reflected from the region may only need to be compared to the level of the ambient light passing through the diffusing surface after a predetermined number of images of the diffusing surface have been captured, since a previous time that these steps were carried out (except for a first time the image is captured after the light source is energized).

It may also be preferable to determine the light level reflected from a plurality of regions that are spaced apart around the diffusing surface instead of from a single region, by capturing all of these regions in the image. If so, the intensity of the light source can be controlled so that the level of the light reflected from all of the plurality of regions exceeds the ambient light level by a predefined amount.

Another aspect of the present invention is directed to a memory medium having machine executable instructions for carrying out the steps of the method discussed above.

Yet another aspect of the present invention is directed to a system for controlling an intensity of a light source in response to an ambient light level. The system includes a diffusing surface, a light source that produces light, a controller that controls the intensity of the light produced by the light source, a region that is generally protected from receiving direct ambient light, said region reflecting light from the light source, and a light for capturing images, producing a signal corresponding to the images captured. A processor is coupled to the light sensor and the controller, and a memory is coupled to the processor. The memory stores a plurality of machine instructions, which when executed by the processor, cause the processor to control the light source relative to the ambient light level by carrying out a plurality of functions. These functions are also generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4:
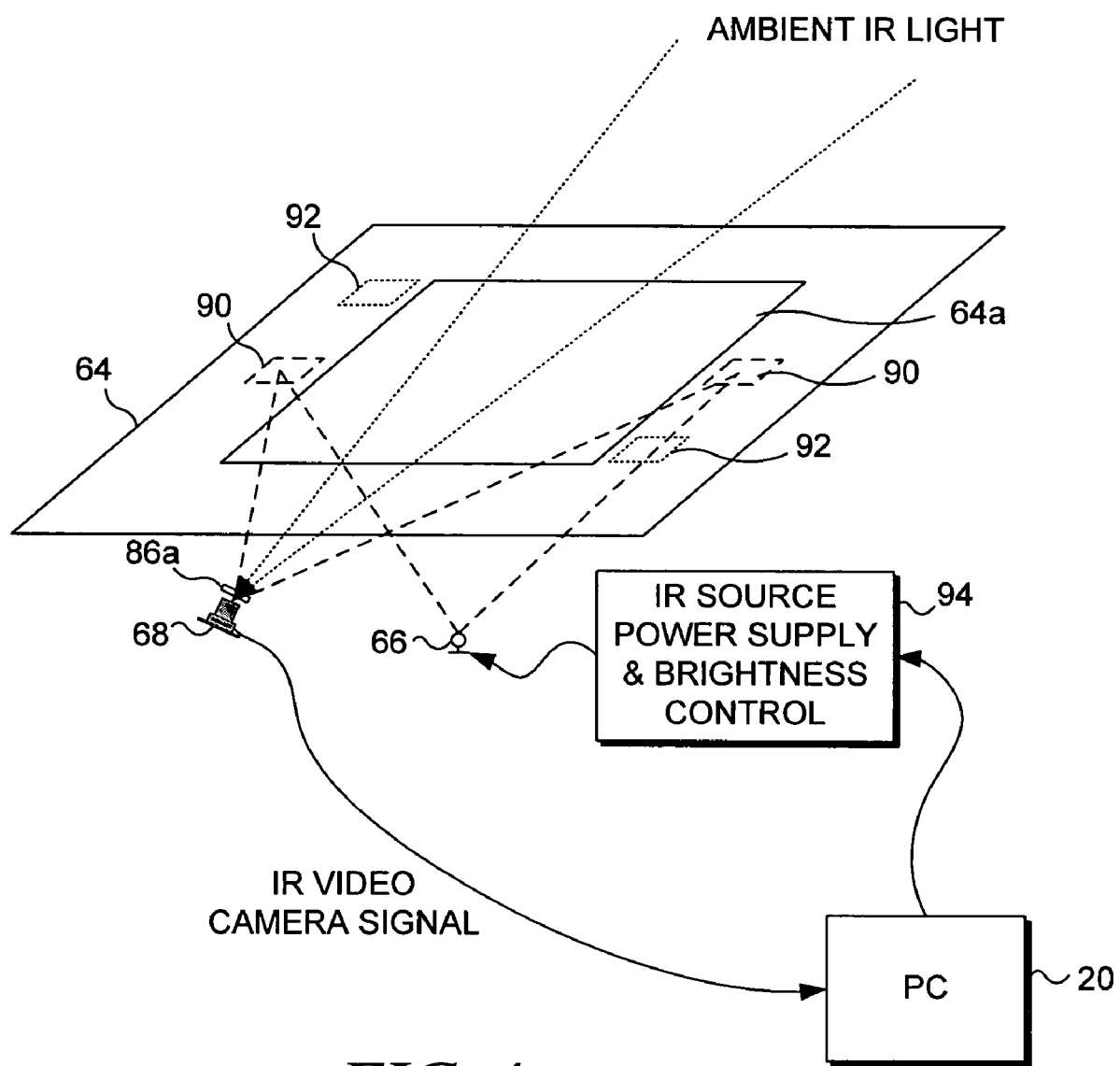
Figure 5:
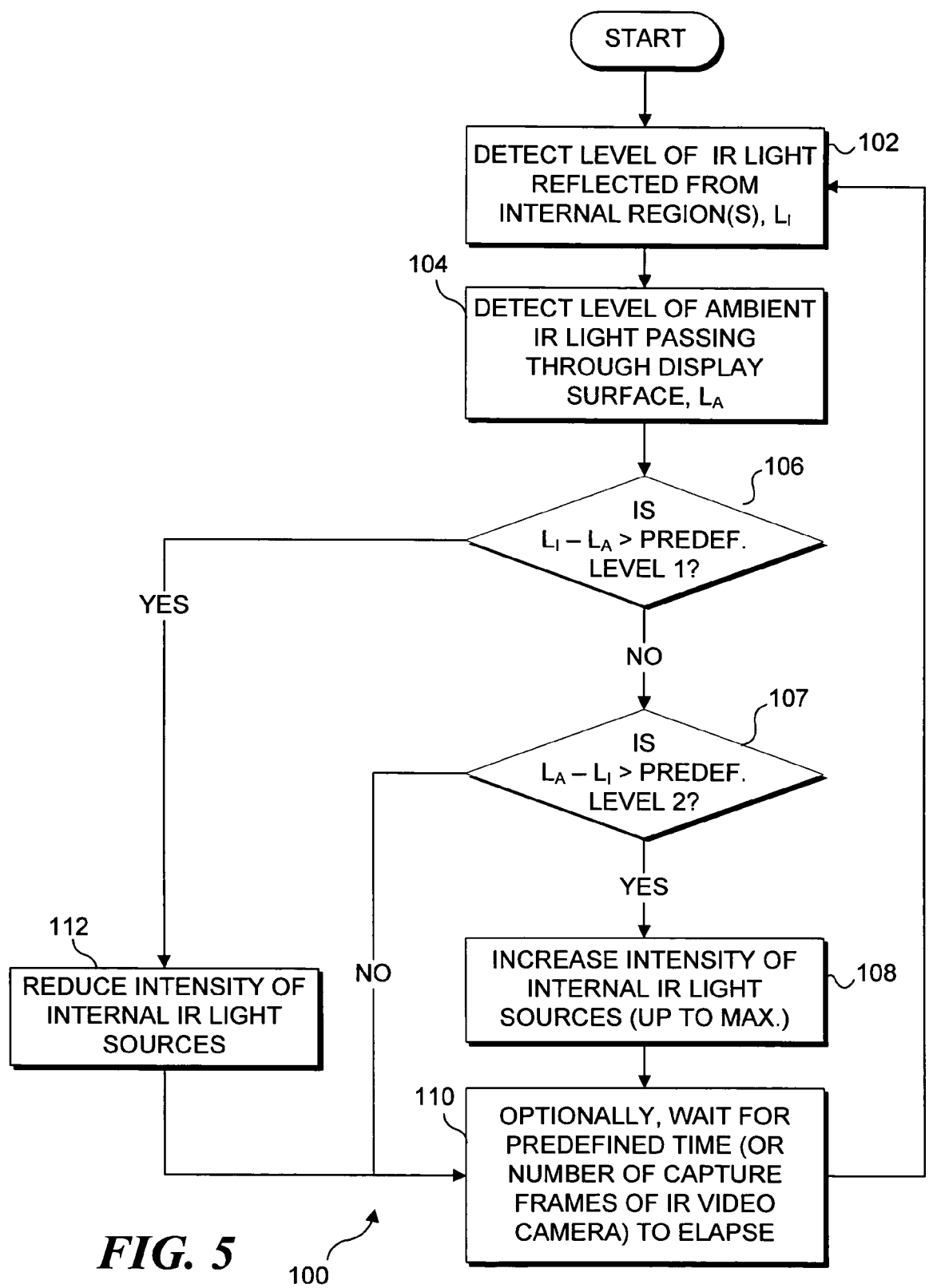

FIG. 4 is an isometric plan view of the top of the interactive table, illustrating the use of target reflective regions for determining a relative intensity of IR light produced by IR sources within the interactive table, for purposes of adjusting the IR light sources in response to an ambient IR light level; and FIG. 5 is a flowchart illustrating the logical steps of a preferred embodiment for carrying out the present invention.

DESCRIPTION OF THE PREFERRED EMBODIMENT

Exemplary Computing System for Implementing Present Invention

Figure 1:
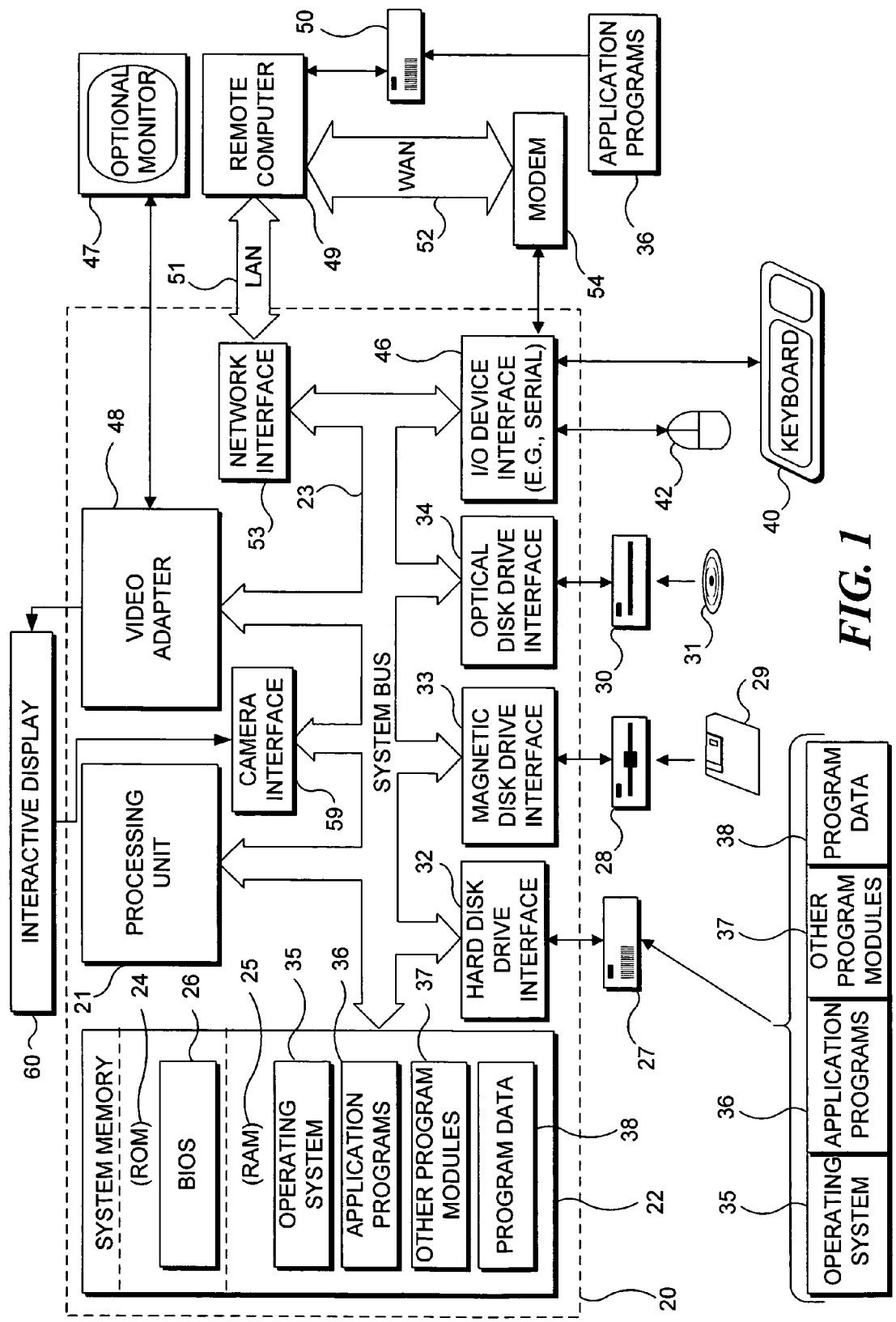
FIG. 1 is a functional block diagram of a generally conventional computing device or personal computer (PC) that is suitable for image processing for the interactive table as used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced using a single computing device, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, e.g., over the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary, and other means of establishing a communications link between the computers may be used, such as wireless communication and wide band network links.

Exemplary Interactive Surface

Figure 2:
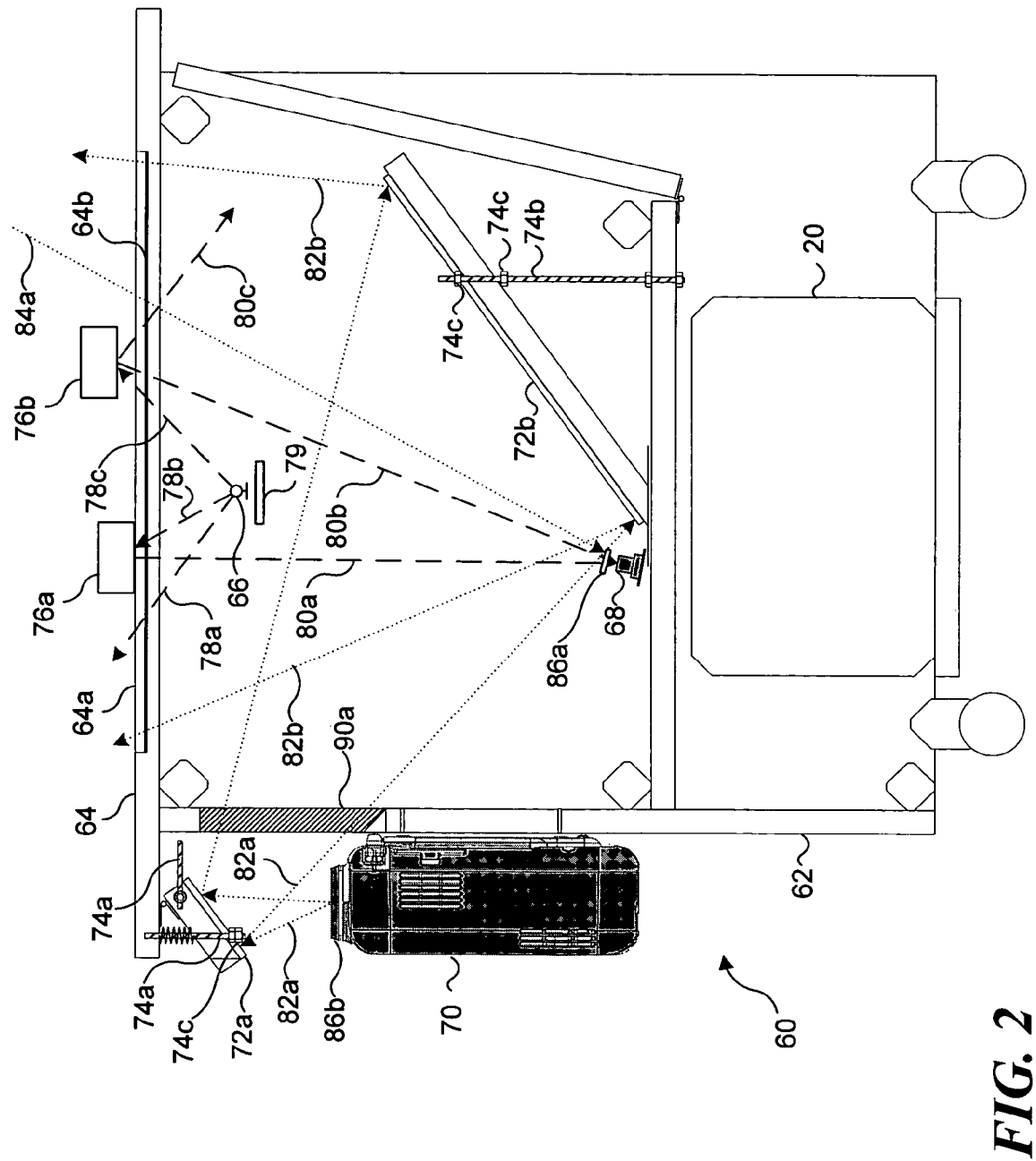
FIG. 2 is a cross-sectional view of the interactive table illustrating internal components.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;
  illuminate objects on the table surface, as indicated by dash line 78b; or
  illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or
  reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
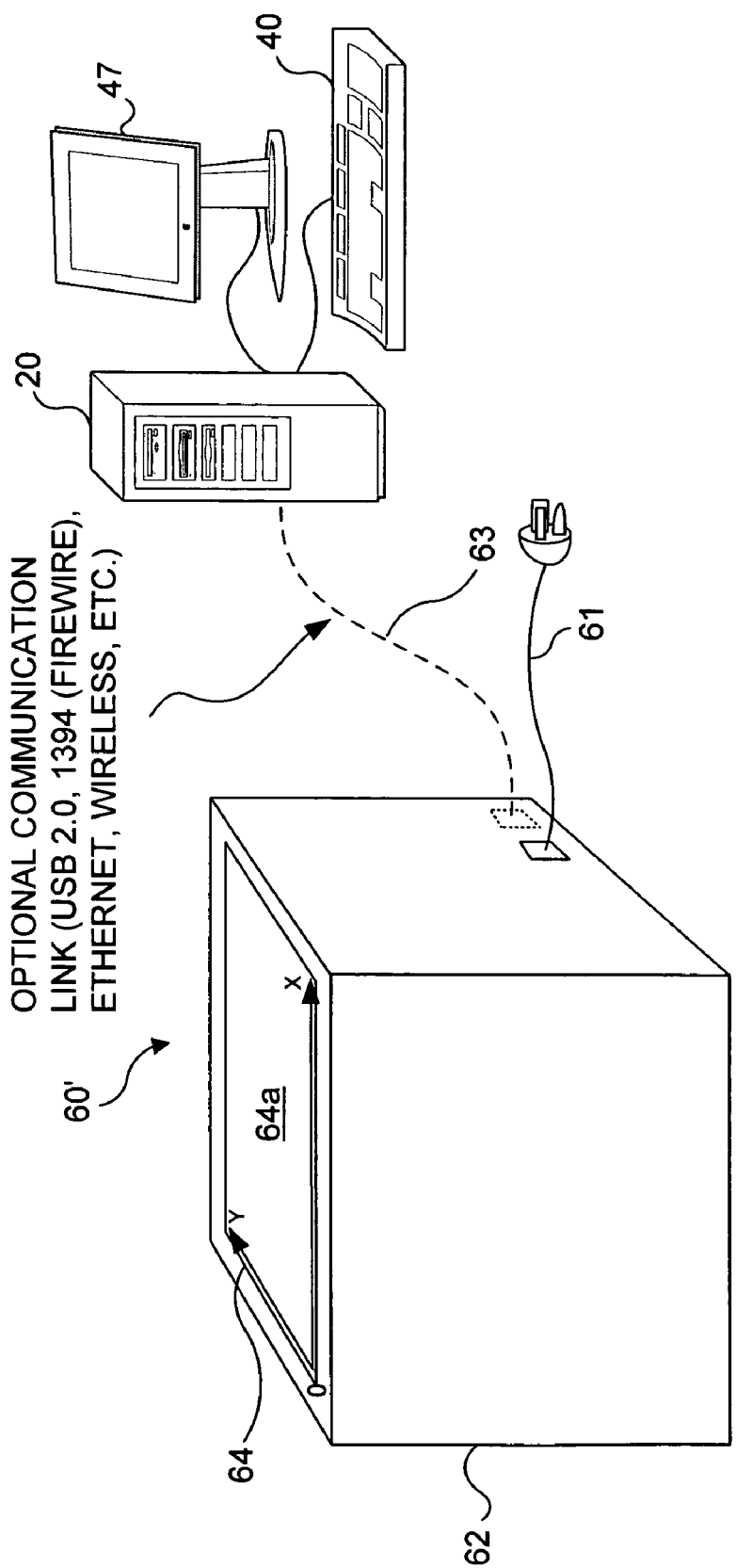
FIG. 3 is an isometric view of an embodiment of the interactive table that is coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64*a*, as well as an origin indicated by "0." While not specifically shown, it will be appreciated that a plurality of coordinate locations along each orthogonal axis can be employed to indicate any location on display surface 64*a*.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64*a* and objects that are resting atop the display surface, such as an object 76*a*, or are hovering just above it, such as an object 76*b*. It is the ability of the interactive display table to visually detect such objects, as well as the user's finger or other object being moved by the user that greatly facilities this rich interaction.

Again referring to FIG. 2, interactive display table 60 includes a video projector 70 that is used to display graphic images, a virtual environment, or text information on display surface 64*a*. The video projector is preferably of a liquid crystal display (LCD) or digital light processor (DLP) type, or a liquid crystal on silicon (LCOS) display type, with a resolution of at least 640×480 pixels. An IR cut filter 86*b* is mounted in front of the projector lens of video projector 70 to prevent IR light emitted by the video projector from entering the interior of the interactive display table where the IR light might interfere with the IR light reflected from object(s) on or above display surface 64*a*. A first mirror assembly 72*a* directs projected light traveling from the projector lens along dotted path 82*a* through a transparent opening 90*a* in frame 62, so that the projected light is incident on a second mirror assembly 72*b*. Second mirror assembly 72*b* reflects the projected light along a path 82*b* onto translucent layer 64*b*, which is at the focal point of the projector lens, so that the projected image is visible and in focus on display surface 64*a* for viewing.

Alignment devices 74*a* and 74*b* are provided and include threaded rods and rotatable adjustment nuts 74*c* for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64*b*, and more importantly, helps in achieving a desired size and shape of the interactive display table, so that the interactive display table is not too large and is sized and shaped so as to enable the user to sit comfortably next to it.

Detecting Relative Levels of Ambient and Light Source IR Light

Referring now to FIG. 4, a schematic illustration shows how the present invention detects the level of ambient IR light that is passing through interactive display surface 64*a* using IR video camera 68. In addition, IR video camera 68 also responds to IR light that is emitted by IR light sources 66, only one of which is shown in this Figure. However, the IR light from IR light sources 66 is not directed toward the IR video camera lens and can only be detected when reflected by an object on interactive display surface 64*a*, or from some other surface. Effectively, IR video camera 68 overscans interactive display area 64*a* and encompasses regions 90, which are disposed peripherally around and at opposite sides of the interactive display surface. Although only two regions 90 are illustrated, it will be understood that any number of additional regions, such as optional regions 92, can also be included, e.g., peripheral to opposite corners of the interactive display surface. Indeed, IR light emitted from IR light sources 66 and reflected from the underside of the table top, for much of the peripheral region surrounding the interactive display region can be included when determining the IR light produced by IR sources 66 that is reflected from the peripheral regions surrounding the interactive display surface. It will be appreciated that regions 90 and optional regions 92 are generally protected from receiving ambient IR light directly, since they are disposed under the surface of the table top and are generally protected from receiving ambient IR light by the enclosure surrounding the components within the interactive display table. The reflectivity of regions 90 corresponds to the reflectivity of objects placed on the interactive display surface, thus it may be desirable to use the same diffusing material for regions 90 (and optional regions 92) that is used for the translucent material 64*b*.

When processing the signal produced by IR video camera 68, PC 20 evaluates the relative level of IR light emitted by IR sources 66 that is reflected from the regions, since the regions are disposed outside the area of interactive display surface 64a included within the image captured by the IR video camera. In addition, the level of ambient IR light passing through interactive display surface 64a can readily be detected in that portion of the image by PC 20, since the limits of the interactive display surface are defined by its X and Y coordinates. Based upon the relative IR levels in the image captured by the IR video camera, PC 20 can thus determine whether the level of the IR light reflected regions 90 exceeds the level of the ambient IR light passing through the interactive display surface. Accordingly, PC 20 can produce an appropriate control signal that is input to an IR source power supply and brightness control 94 to control the intensity of IR light emitted by IR light sources 66. Details of the IR source power supply and brightness control are not provided herein, since one of ordinary skill in the art will understand how any convention power supply with a current control can be used for varying the current supplied to the IR LEDs or other IR light emitting devices used for IR light sources 66.

Further details of the logic employed in the present invention for controlling the level of IR light emitted by IR light sources 66 are illustrated in a flowchart 100 in FIG. 5. As shown in this flowchart, a step 102 provides that the level of IR light reflected from internal regions 90 (and optionally regions 92) in an image captured by the IR video camera is detected, yielding a value $L_I$. A step 104 provides for detecting the level of ambient IR light passing through the interactive display surface in this captured image, producing a value LA. Next, a decision step 106 determines if the difference between $L_I$ and $L_A$ is greater than a predefined level 1. In other words, this decision step determines if the level of IR light reflected from the regions is greater than the level of the ambient IR light that is passing through the interactive display surface by the predefined amount. If not, a decision step 107 determines if the difference between $L_A$ and $L_I$ is greater than a predetermined level 2. If so, the logic proceeds to a step 108, which provides for increasing the intensity of the internal IR light sources, e.g., by a specified percentage, such as 5%. Since any light source has a rated maximum output level, clearly, it will not be possible to further increase the level of IR light reflected from the regions once the IR light sources have reached their maximum output. However, until that point is reached, step 108 results in PC 20 causing the IR source power supply and brightness control to provide more current to the IR light sources so that their output level is increased. Decision steps 106 and 107 thus evaluate the three possible conditions, i.e., whether the intensity of the IR light sources is too low, too high, or sufficient. The difference between the level of the IR light emitted by the IR light sources that is reflected from the regions and the level of the ambient IR light that is passing through the display surface is controlled to be between the predefined level 1 and 2, to insure that excessive IR light is not produced by the IR light sources that might interfere with other devices such as remote controls that use IR light for controlling a television and other entertainment equipment, or for other purposes.

Optionally, in a step 110, the logic can wait for a predefined time interval to elapse, or as a further alternative, can wait for a predefined number of frames of the IR video camera to be captured before returning to step 102 to again detect the level of IR light reflected from the regions around the periphery of the interactive display surface.

In the event that the determination made in decision step 106 indicates that the level of IR light reflected from the regions exceeds the level of the ambient IR light passing through the display surface by more than the predefined level, the logic proceeds to a step 112. In step 112, PC 20 causes the intensity of the IR light sources to be reduced by a specific percentage, e.g., by 5%. The logic then again continues with optional step 110. If optional step 110 is not employed, the logic can simply return from either step 108 or step 112 to step 102.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A system for controlling an intensity of a light source in response to an ambient light level, comprising:
    (a) a diffusing surface through which ambient light passes;
    (b) a light source that produces light;
    (c) a brightness controller that controls the intensity of the light produced by the light source;
    (d) a region generally protected from receiving direct ambient light, said protected region reflecting light from the light source;
    (e) a light sensor;
    (f) a processor coupled to the light sensor and the brightness controller; and
    (g) a memory coupled to the processor, the memory storing a plurality of machine instructions, which when executed by the processor, cause the system to:
        (i) use the light source and light sensor to detect a level of reflected light reflected from the protected region;
        (ii) use the light sensor to detect a level of ambient light passing through the diffusing surface;
        (iii) compare the level of reflected light to the level of ambient light to determine if the intensity of the light source is appropriate based on the ambient level of light; and
        (iv) regulate the intensity of the light source with the brightness controller, so that the light intensity is sufficient to reflect off of objects at or near the diffusing surface but the light intensity is not so great as to interfere with other nearby electronic devices that communicate using light signals.

2. The system of claim 1, wherein the light source produces infrared (IR) light, and the ambient light level is an ambient IR light level.

3. The system of claim 1, wherein the protected region is disposed peripherally of the diffusing surface and within an enclosure that shields the protected region from the ambient light being directly incident on the protected region.

4. The system of claim 1, further comprising a plurality of protected regions spaced apart around the diffusing surface, wherein the plurality of machine instructions further cause the processor to process the signal to determine the light level reflected from the plurality of protected regions, and to control the intensity of the light source so that the level of the light reflected from all of the plurality of regions exceeds the ambient light level by a predefined amount.

5. The system of claim 1, wherein the protected region comprises an underside of a peripheral area generally surrounding the diffusing surface.

6. The system of claim 1, further comprising a baffle disposed between the light source and the light sensor that substantially prevents light produced at the light source from directly entering the light sensor.

7. The system of claim 1, wherein comparing the level of reflected light to the level of ambient light comprises determining if the difference of subtracting the reflected light level from the ambient light level is greater than a first predefined level, the first predefined level representative of a light intensity that potentially interferes with other electronic devices that use light for communication.

8. The system of claim 1, wherein regulating the intensity of the light source with the brightness controller comprises sending a control signal to the brightness controller to reduce the intensity of the light source to reduce potential interference with other devices.

9. The system of claim 1, wherein comparing the level of reflected light to the level of ambient light comprises if the difference of subtracting the ambient light level from the reflected light level is greater than a second predefined level, the second predefined level representative of a light intensity that potentially prevents the detection of objects at or near the diffusing surface.

10. The system of claim 1, wherein regulating the intensity of the light source with the brightness controller comprises sending a control signal to the brightness controller to increase the intensity of the light source to increase the likelihood of light reflecting off of objects at or near the diffusing surface.

* * * * *